April 8, 1930.  E. B. ATKINSON  1,754,074
LID OR COVER FASTENER FOR MILK CANS
Filed Jan. 24, 1929
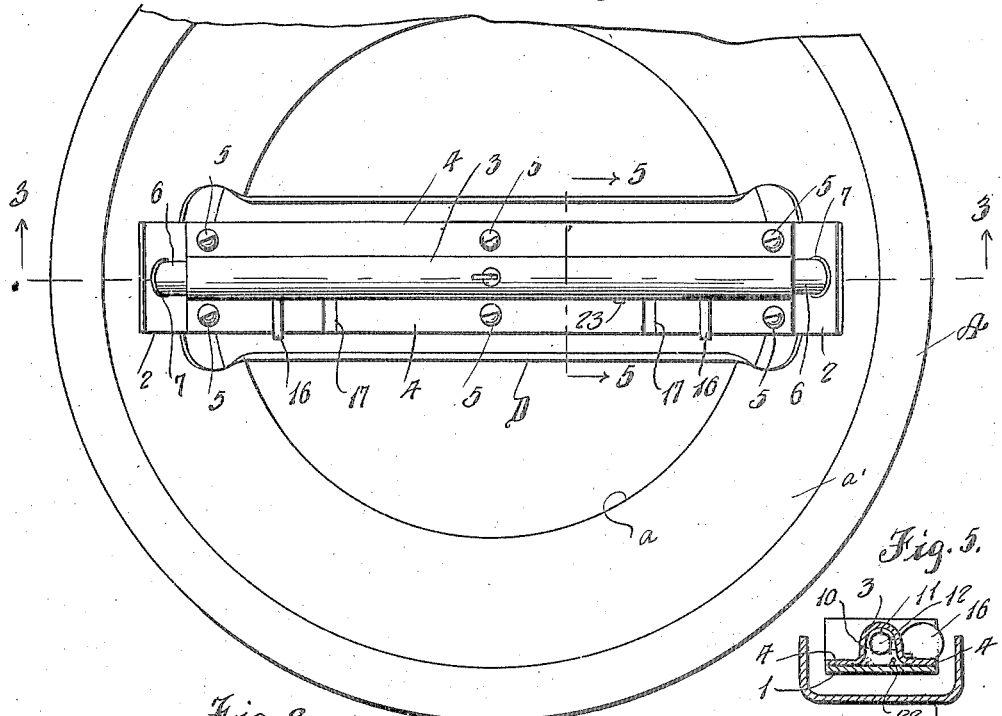
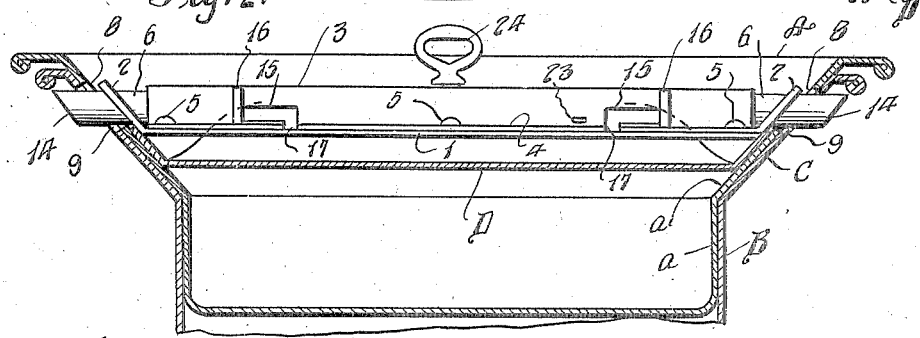
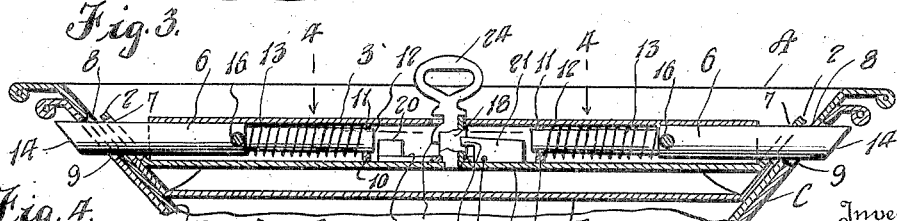
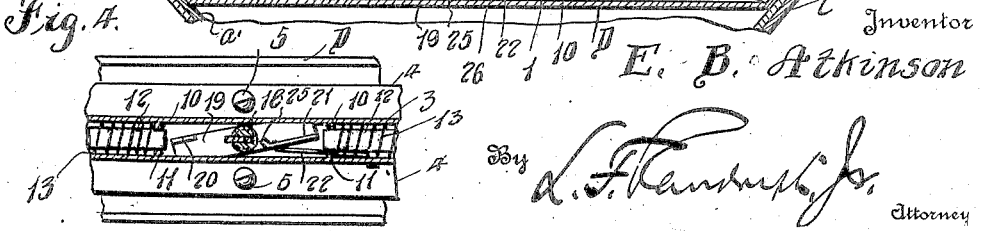
Inventor
E. B. Atkinson
Attorney Patented Apr. 8, 1930

1,754,074

UNITED STATES PATENT OFFICE

ELIJAH B. ATKINSON, OF OAKLEY, KANSAS

LID OR COVER FASTENER FOR MILK CANS

Application filed January 24, 1929. Serial No. 334,776.

The invention relates to means for locking the lids or covers of milk cans in closed position and has for its object the provision of a locking means that is simple in construction, that is reasonable in cost of manufacture, that is easy to operate, and efficient in operation and that will not interfere with the preservation of the purity of the contents of the can.

A further object of the invention is the provision of a lock for milk can covers comprising a lock casing adapted to be secured to the cover of the can, and having oppositely directed sliding bolts and providing key controlled means to hold the sliding bolts in locked position to prevent unauthorized removal of the cover.

The invention will be described in detail hereinafter and will be found illustrated in the accompanying drawings in which Figure 1 is a fragmentary top plan view of a milk can cover showing the improved locking means in position thereon, Figure 2 is a side view in elevation of the lock showing it applied to the upper fragment of a milk can and its cover, said part being shown in section, Figure 3 is a transverse sectional view on a plane indicated by the line 3—3 of Figure 1, Figure 4 is a fragmentary horizontal sectional view on a plane indicated by the line 4—4 of Figure 3, and Figure 5 is a sectional detail on a plane indicated by the line 5—5 of Figure 1.

In the drawings similar reference characters are used to designate corresponding parts throughout the several views.

The locking device is adapted to be secured to the cover A of a milk can, the top of the can being shown in Figures 2 and 3, the neck portion being designated B, and having an outwardly flared lip C. The cover A is provided with a cylindrical portion $a$ to fit the neck B and with an outwardly flared portion $a'$ to fit the outwardly flared portion C of the top of the can. D indicates a handle that is secured in the cover A for removing and replacing it.

A lock for holding the cover in closed position on the can consists of a base plate 1 having upturned and inclined ends 2 corresponding to the flared portion $a'$ of the cover and secured thereto in any suitable manner such for instance as welding or soldering. 3 indicates an elongated casing or housing having laterally projecting flanges 4 secured to the plate 1 by means of screws or rivets 5. The ends of the housing 3 are open and slidably mounted in the open ends thereof are bolts 6 that project through openings 7 in the ends 2 and are adapted to engage in alined openings 8 and 9 in the cover and can respectively. 10 indicates partitions in the housing 3 and provided with openings 11 that slidably receive the reduced ends 12 of the bolts 6, 13 indicating expansible coil springs closing the reduced ends of the bolts and terminally engaging the bolts and the partitions 10 to normally hold the bolts projected. The outer ends of the bolts 6 are inclined as shown at 14 to retract the bolts when the cover A is inserted in the top of the can by engagement with the flared portion C of the top of the can to automatically engage the bolts with the openings 9. A side wall of the housing 3 is provided with bayonet slots 15 and 16 indicates a flat headed lug secured to each bolt 6 and slidable in said slot for operating the bolts to retract them. The bayonet slots 15 are extended as shown at 17 transversely of the adjacent flange 4, this arrangement permitting removal and replacement of the bolts in the housing, and also providing stops to receive the flat headed lugs 16 to hold the bolt in retracted position by slightly rocking the bolt in the direction of the slot 17 when the lugs are actuated to their rearmost positions in retracting the bolt.

18 indicates a lock cylinder that is rotatably mounted in alined openings in the base plate 1 and wall of the housing 3 and 19 indicates an elongated plate rotatably mounted on the cylinder and provided with lugs 20 and 21 to aline with the rear ends of the bolts 6 and prevent withdrawal of the bolts. 22 indicates a spring engaging at one end the plate 19 and having its other end extended through an opening 23 in the wall of the housing 3, said spring serving to normally hold the plate 19 in the position shown in Figure 4 to prevent retraction of the bolts 6. The cylinder 18 is slotted to receive a key 24, and 25 is a ward on the key 24 to engage a lug 26 on the projection 21 to rotate the plate 19 to disaline the projections 20 and 21 with the ends of the bolts 6 to permit retraction of the bolts when it is desired to remove the cover from the can. It will be understood that by providing keys with differently positioned and shaped wards to engage differently positioned and shaped lugs the operation of the locking means may be selective, so that dairymen in certain neighborhoods may have exclusive control of the locks on their cans, but the cream operator or purchaser of the products of the dairymen may be provided with master keys for unlocking a series of locks.

What is claimed is:—

1. A lock, comprising a sliding bolt, a casing slidably mounting said bolt and provided with a bayonet slot, a lug secured to the bolt and movable in said slot to retract the bolt and hold it in retracted position, a plate rotatably mounted in the casing, a lug on said plate to engage the bolt and hold it from retraction, a spring engaging said plate and holding it normally in position to prevent retraction of the bolt, a lock cylinder rotatably mounted in the casing and journaling the plate, said cylinder being slotted to receive a key to turn it, and a projection on the plate engageable by the key to rotate the plate into bolt releasing position.

2. In a locking device for milk cans, a lock casing adapted to be secured to a milk can cover, a sliding bolt in said casing and adapted to engage in alined openings in the cover and can, spring means engaging the bolt to hold it in locked position, means to retract the bolt and hold it in retracted position, and key operable means to prevent retraction of the bolt.

3. In combination with a milk can, a cover therefor, said can and cover having alined openings therein, a lock casing secured to the cover, a bolt slidably mounted in said casing and adapted to engage in said alined openings, a spring engaging the bolt and holding it normally in projected position, a plate rotatably mounted in the casing, a lug on said plate adapted to engage the bolt to prevent its retraction, spring means engaging the plate and holding the lug in engaging position, and key operable means to rotate the plate and move the lug to non-engaging position.

In testimony whereof I affix my signature.

ELIJAH B. ATKINSON.